May 21, 1929.  J. D'ASSELER  1,713,866

WIND MOTOR

Filed Nov. 12, 1927  3 Sheets-Sheet 1

Inventor.
Jules D'Asseler,
per
Attorney.

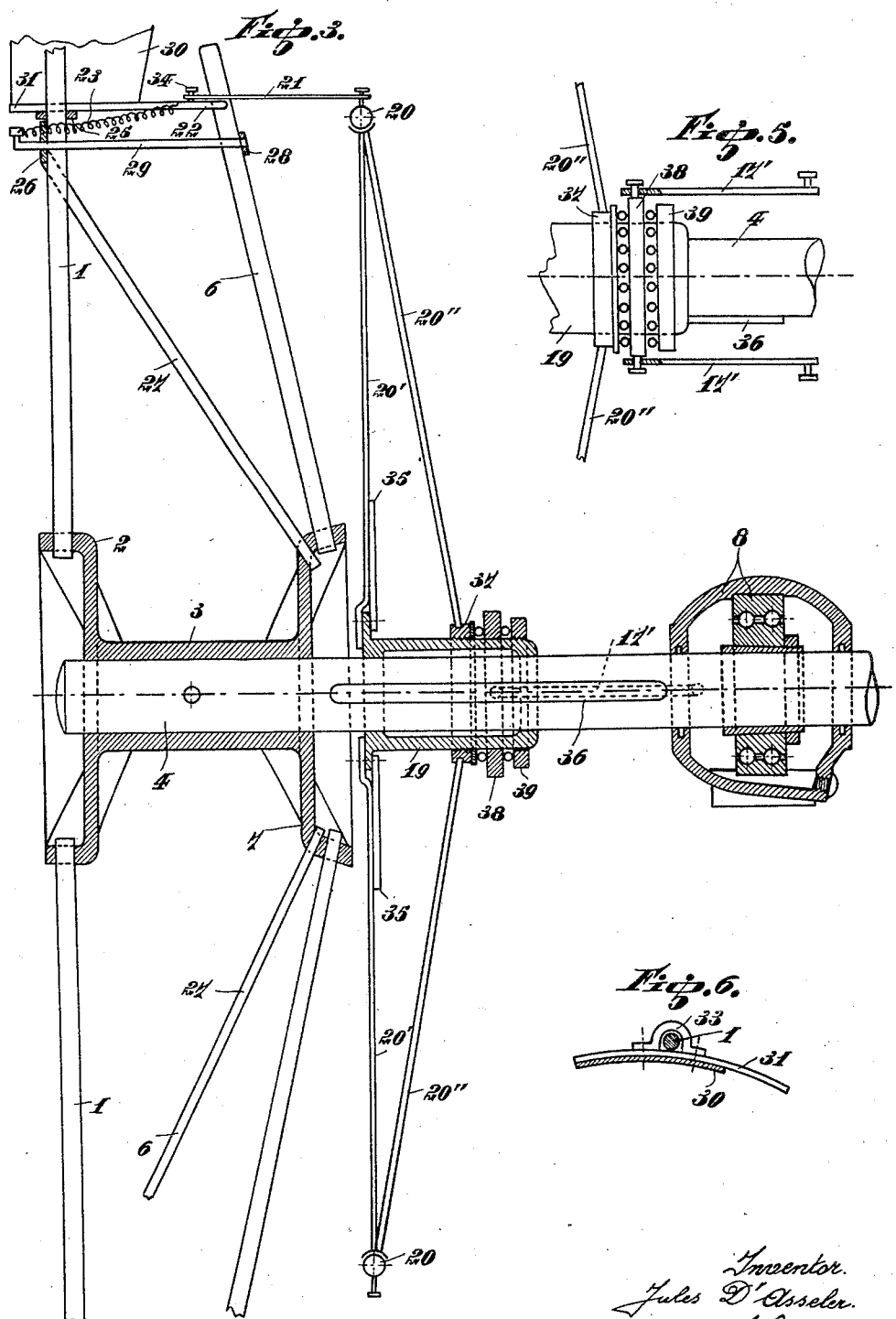

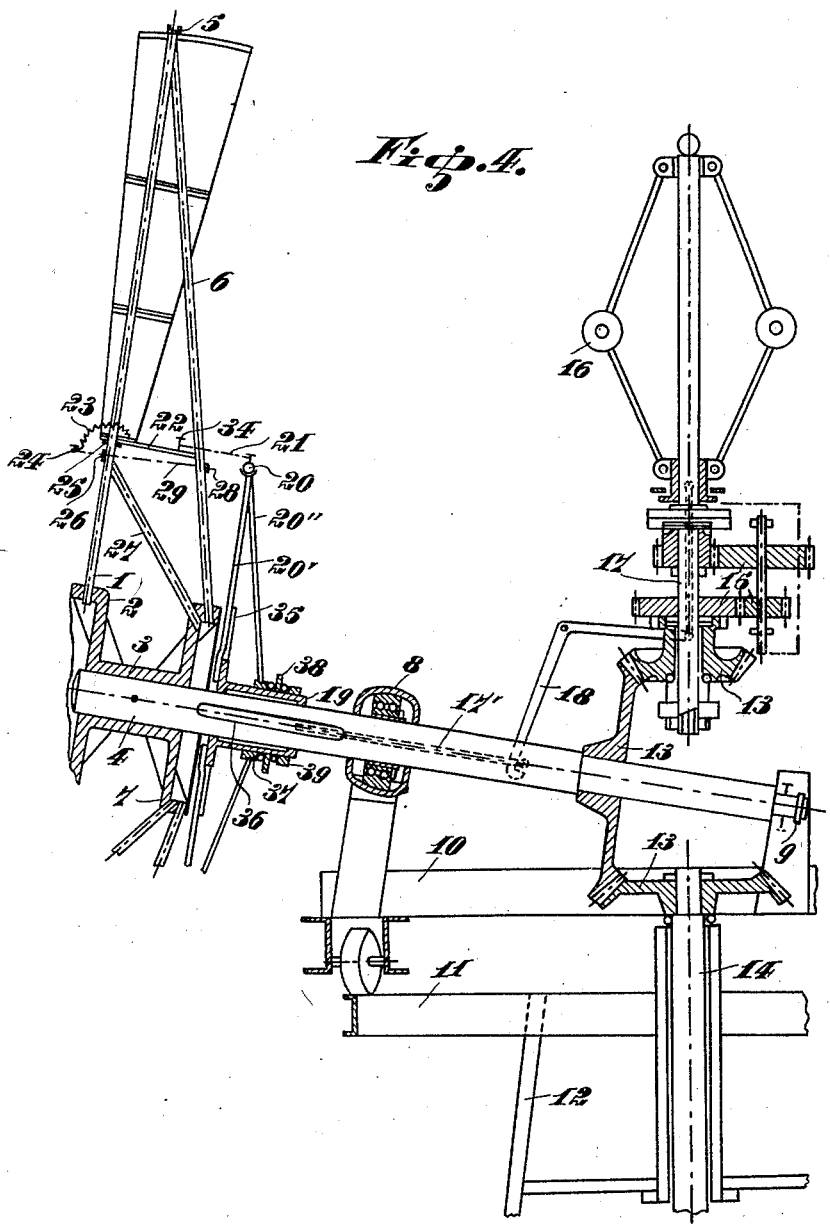

Patented May 21, 1929.

1,713,866

UNITED STATES PATENT OFFICE.

JULES D'ASSELER, OF GHENT, BELGIUM.

WIND MOTOR.

Application filed November 12, 1927, Serial No. 232,910, and in Belgium November 20, 1926.

The present invention has for its object an improvement in wind motors, and it especially relates to those of the type wherein a wheel is equipped with movable wings or vanes which, through the action of an automatically acting regulator, influenced by the rotary speed imparted to the wheel by the wind, can so recede as to escape action of the wind on its blowing with excessive intensity and are thus drawn-in as a result of modifying their angular position with respect to the general plane of the wheel.

To be really useful and capable of a wide field of employment, any wind motor should answer certain technical requirements, among which the following are of the utmost importance:

(1) It should, for example, be capable of running at any time, day or night, subject to no attendance or special interfering in order to regulate its function; it should accordingly be regulated by an automatic device of very great sensitiveness, i. e. capable of prompt reaction to cause the wheel vanes to recede so as to be no longer exposed to the action of the wind on this latter blowing too violently: an occurrence most dangerous for the safe running of any wind motor.

(2) The engine should not have its size restricted; in other words, it should be so devised as to take avail of winds even of little intensity.

Now, one of the capital factors for securing these results, is that the vane-wheel should be capable of promptly reaching a fair velocity, subject to no abnormal strain whatsoever.

Now, to be capable of answering the requirement with respect to promptly reaching a certain speed, the wheel should comply with the following conditions:

(1) The wheel should be of light construction, though keeping sufficient rigidity and resistance to the gusts of wind, and should be of a size advantageous in practice; this is also true for the members which are attached to that wheel and are to be driven by it, as is the case for certain parts of the regulating device, the lightness of which renders them easily movable whereby the sensitiveness of the regulating device is also increased, as is also the facility wherewith this device acts on being influenced by the various rotary speeds of the wheel;

(2) The vanes of said wheels should be so constructed and arranged as to keep sufficiently stable irrespective of their adjusted position.

The chief object of this invention is to secure an improved vane-wheel sufficiently light to promptly and easily reach up to a fair velocity, though keeping sufficient rigidity and resistance.

The construction and adaptation of a vane-wheel whereby the purpose mentioned can be answered and satisfactory as to the above-stated requirements, has been shown in the accompanying drawings, wherein:

Fig. 3 is an axial section through the central part of the wheel and the parts connected therewith, and Fig. 4 is an approximately axial section of the whole superstructure of a constructive embodiment of the wind motor wherein the improved wheel is adapted.

Fig. 5 is a plan view showing the movable sleeve and rods transmitting the action of the governor;

Fig. 6 is an amplified detail of the mounting of the vanes upon the spokes.

Figure 1:
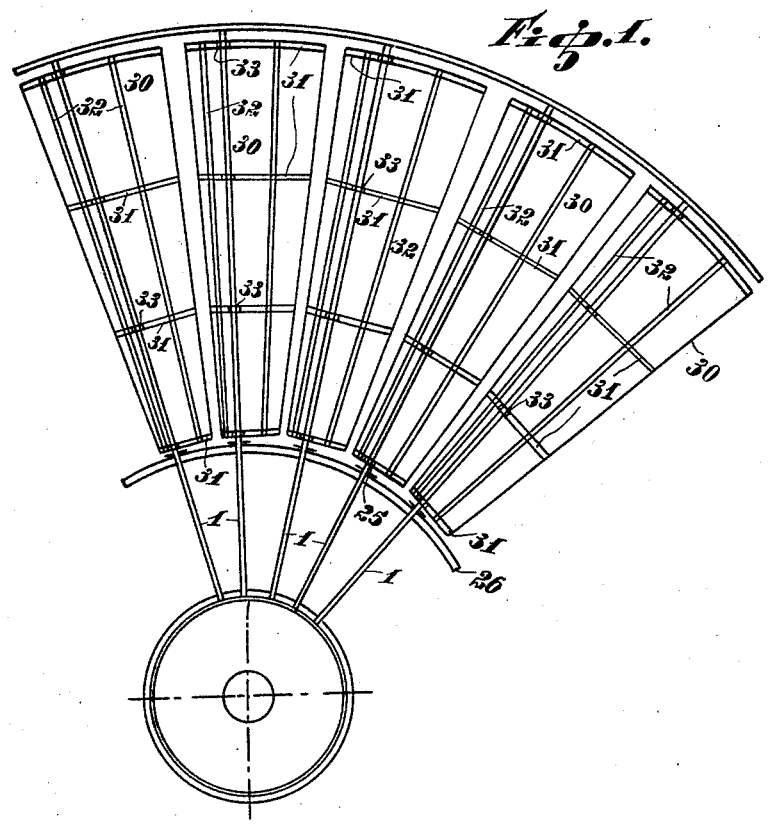
Fig. 1 is a front view of the vane-wheel constructed in accordance with the invention.
Figure 2:
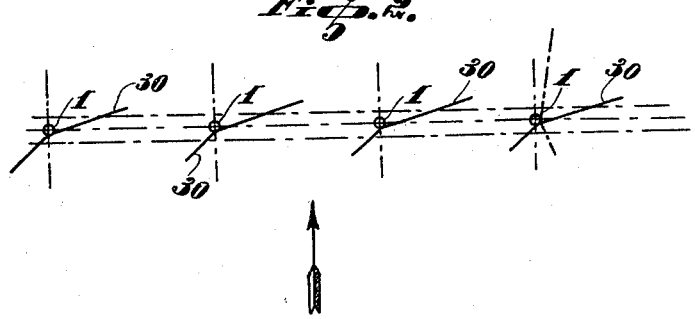
Fig. 2 is an amplified detail to show the outside ends of the vanes, over a portion of the wheel periphery.

As illustrated in Fig. 3, the vane-wheel comprises a nave 3, each end of which has been reinforced by a flange, 2 and 7 respectively, each flange bearing radial spokes arranged at regular intervals, say, upon the outer flange 2, a series of spokes 1 perpendicular to the wheel axis, and, upon the inner flange 7, a series of propping spokes 6 which are inclined with respect to said axis. All of those spokes have their end fastened upon a peripheral rim 5, which is preferably a U-shaped iron of circular section. A collar 25 is fastened on to the spokes at a point about one third the length of each spoke, starting from the centre. Under and adjacent the collars 25, the spokes 1 are connected together by a hoop 26 to which are fixed a number of tie-rods 27 branched off the internal flange of the nave 3. Another hoop 28 placed at the same height as hoop 26, serves to connect the oblique spokes 6 together. Hoops 26 and 28 are connected together by brace bars 29 which extend a little beyond hoop 26 at the front part of the wheel and end in a hook 24 which, as will be explained further on, is one of the fastening points for return springs 23. Around each spoke 1, between rim 5 and a point situated at a suitable distance (as a rule, one third of the wheel radius) from the wheel centre, a vane 30 is rotatably mounted and preferably made of sheet-iron reinforced by metal cross bars 31 and 32 the first of these being of transverse direction and the second named extending in radial direction. Vanes 30 are so mounted as to be capable of turning about spokes 1 by means of half-collars 33 which are either bolted or fastened otherwise to the transverse cross bars 31 as clearly shown in Fig. 6. The transverse cross bar 31 which is nearest the wheel centre, extends beyond one of the vane corners, to form a control arm 22 through the medium of which the regulating device can control the angular position of the vane, in a manner which will be explained further on. This control arm 22 can, when the vane has reached its utmost angular positions, press against the corresponding spoke 6 (on the vane reaching its receded or drawn-in position) and press against the spoke 1 of the vane turning next (on the vane being exposed to the wind). The corresponding spoke 6 and the spoke 1 of the next vane will thus form, for the control arm 22 of the vane being dealt with, two abutment stops which correspond to the two utmost angular positions the vane is liable to. The arm 22 has, attached to its free end, a hook 34 to which is attached a rod 21 provided for each vane and being part of the regulating device. As is clearly shown in Fig. 3, every rod 21 ends upon a tubular hoop 20 which is a rim for a series of spokes preferably made of U-shaped iron bars 20' which are attached, by a circular plate 35, to the flange of a sleeve 19, which, on being guided by means of a spline 36, can slide along shaft 4 to which the nave 3 of the vane-wheel is fixed, said shaft being inclined (in most cases, at about 8° to the horizontal). The hoop 20 and the unit it constitutes together with the spokes 20' and the plate 35, are reinforced by means of propping spokes 20'' which are inclined and are radially branched off a crown 37 fixed upon the sleeve 19 and ending upon hoop 20. A collar 38 is passed round sleeve 19, said collar rotating on ball bearings maintained by a clamping nut 39 to be screwed on to sleeve 19; this collar has two lateral trunnions to which are attached two rods 17' which extend parallel to shaft 4, as shown in Fig. 5 and provide for connection with the regulating device. This device, as can be seen in the illustrated embodiment, consists of a centrifugal governor 16 mounted centrally in the line of the vertical axis of the tower 12, this tower being equipped at its top part with a circular track rail 11 supporting a rotatable slide or carriage 10, which in its turn carries the bearings 8 and 9 of the wheel shaft 4. This latter actuates the regulating device through the intermediary of multiplying ratio gear-wheels (spur wheels) 15 and of bevel gear-wheels 13 whereby the vertical shaft 14 which transmits the power, and is extended on to the centre of the tower 12, is likewise operated. Regulating device 16, being thus influenced by the rotary speed of the vane-wheel will, on this speed increasing (and through the intermediary of rods 17 and crank levers 18 suitably contrived) cause a traction to be exerted towards the centre of the machine, upon the rods 17' mentioned above, this traction will be, by means of sleeve 19 and of the unit comprising 35—20'—20'', transmitted on to rods 21 and to control arms 22 which will thus act upon the vanes 30 to bring these nearer the radial plane passing through the axis of shaft 4 and through that of the spokes 1. The vanes will thus be less influenced by the wind action, the velocity of the wheel decreases, the regulating device does not exert so intense a traction upon the sleeve 19, the return springs 23 extending from hooks 24 on to the arms 22, can thus bring the vanes 30 again in a plane nearer that of the wheel. In the example here shown, the vanes are divided into two very unequal portions by their swivelling axis, which coincides with the axis of spokes 1; the portions of the vane which are on the two sides of the divisional line, form together a certain angle. It should be understood, however, that the principle of the wheel and of the auxiliary members as per the invention, could be carried into practice by the employment of other types of vanes, say, amongst others, vanes absolutely plane, and divided into two equal portions by their swivelling axis.

It should be observed that, in the wheel devised after this invention, the construction is rendered considerably lighter by having the vanes mounted direct upon their spokes 1 by means of the half-collars 33, as shown in Fig. 6, instead of being fastened on to other members such as U-shaped iron bars which in turn should be mounted upon the spokes, but despite this saving in weight, the present wheel has, thanks to the rational arrangement of the framing members, as per the invention, the advantage of a maximum resistance, owing to which it can be given favourable dimensions.

As a result of the vanes being mounted direct upon their spokes 1 the actual strain these spokes are submitted to for the maintenance of perfect rigidity of the wheel, is not exerted any nearer than at the point wherefrom the vanes are branched off, i. e. at a distance about one third of the wheel radius, starting from the wheel centre.

It will be observed that all of the improvements thus secured in the construction of the vane-wheel cooperate to increase the sensitiveness of the air-driven engine, and, therefore, allow the wheel to promptly acquire a fair velocity. This design of the wheel therefore considerably enhances the yield of the engine, irrespective of atmospherical conditions, and it also provides for safer running.

I claim:

1. In a wind motor of the type described, a vane-wheel comprising in combination a hub fixed to the end of the main rotary shaft, a series of spokes perpendicular to the wheel axis radially mounted in a hub flange; a metal hoop connecting these spokes at a distance from the wheel centre equal to one third of the length of a spoke; a rim connecting the ends of the spokes; a collar fitted to each spoke outside the inner hoop, a vane being fitted between said collar and the rim; a second series of spokes inclined with respect to the first named series and mounted in a second inner flange of the hub and joining the rim; an internal reinforcing hoop connecting said inclined spokes; brace bars between the internal hoop of the two series of spokes and steadying spokes branched off the second inner hub flange to strengthen the perpendicular spokes, substantially as described.

2. In a wind motor of the type described, a vane-wheel comprising in combination a hub fixed to the end of the main rotary shaft, a series of spokes perpendicular to the wheel axis radially mounted in a hub flange; a metal hoop connecting these spokes at a distance from the wheel centre equal to one third of the length of a spoke; a rim connecting the ends of the spokes; a collar fitted to each spoke outside the inner hoop, a sheet metal vane being fitted between said collar and the rim and being fixed to the perpendicular spoke by means of half-collars riveted to reinforcing cross bars of the vane; a second series of spokes inclined with respect to the first named series and mounted in a second inner flange of the hub and joining the rim; an internal reinforcing hoop connecting said inclined spokes; brace-bars between the internal hoops of the two series of spokes and steadying spokes branched off the second inner hub flange to strengthen the perpendicular spokes, substantially as described.

In testimony whereof I signed hereunto my name.

J. D'ASSELER.